Patented Jan. 16, 1934

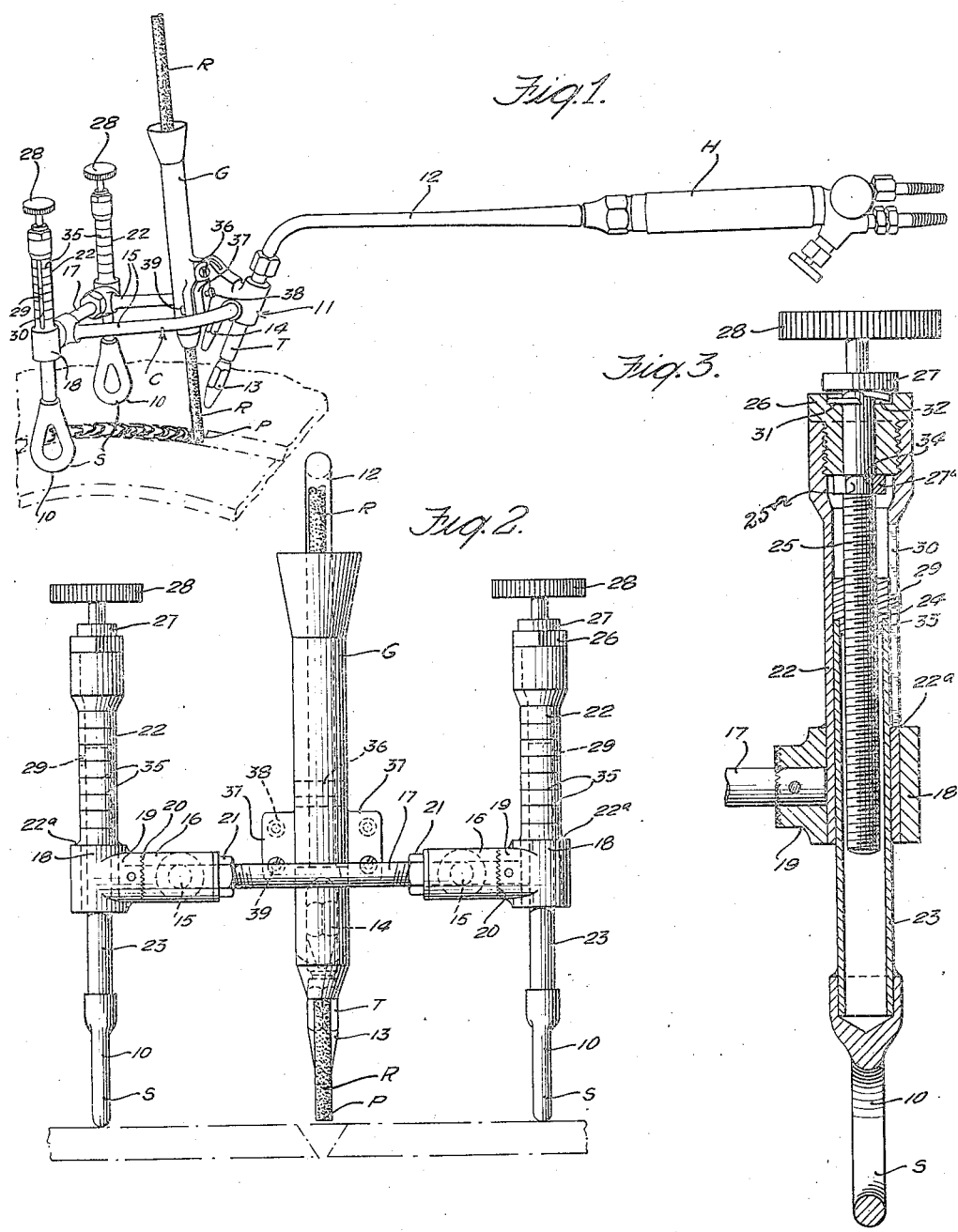

1,944,125

UNITED STATES PATENT OFFICE 1,944,125

WELDING AND CUTTING APPARATUS

John M. Halbing, Bloomfield, N. J., assignor to The Linde Air Products Company, a corporation of Ohio Application July 23, 1932. Serial No. 624,230

11 Claims. (Cl. 266—23)

This invention relates to welding and cutting apparatus, more particularly to the kind adapted for hand operation and in which the weight of the apparatus is partially or wholly supported upon the work by runners or the like. The invention is an improvement upon one disclosed in a copending application Ser. No. 576,894, filed November 23, 1931 in the name of R. J. Kehl.

Heretofore, in apparatus of this character, two supporting runners have been provided which have been made axially adjustable by providing them with stems in threaded connection with the carriage of the apparatus. Such adjustment is effected by rotating these stems about their axes whereby the portion thereof below the carriage is shortened or lengthened according as the stems are turned in one or the other direction and the runners are held in adjusted position on the carriage by means of lock nuts positioned on the stems both above and below the connection with the carriage. Special tools are therefore required whenever an adjustment of the runners is to be made for loosening and tightening these lock nuts before and after adjustment and it is necessary to lift the apparatus off the work in order that the runners may be effectively rotated in making the adjustment. In certain situations, it is desirable to have a very accurate and almost micrometer relative adjustment between the two runners and between the runners and the carriage to provide the proper height and position for the blowpipe and so that the flame from the blowpipe may be projected accurately in the desired direction, or in order that one of the runners may be projected below the other to accurately compensate for a known difference in height between two work members being operated upon and where, accordingly, it is desirable that one runner should rest upon the higher and the other upon the lower member. Such a situation may occur for example in the welding together of overlapping members and in cutting along the line of a shoulder. It is also desirable, with apparatus of this character under certain circumstances, that the runners be capable of adjustment while resting in place on the work in order that the operator may judge with his eye as to when proper adjustment has been made.

It is therefore an object of this invention to provide in blowpipe apparatus having runners connected to its carriage for supporting the apparatus upon work, novel means for effecting adjustment of the runners relative to the carriage without the use of tools and while the runners are resting upon the work, and in which apparatus a fine and accurate relative axial adjustment between the runners and between each runner and the carriage may be simply and easily effected.

According to the invention, the stems provided on the runners of an apparatus of the above character may be arranged to be telescopically received within tubular sleeves which are rigidly mounted on the carriage and the stems may be provided with axial bores having threaded portions in engagement with the shanks of screws mounted in the sleeves for rotation relative to the sleeves and stems but secured against axial movement relative thereto. The stems may be prevented from rotating relative to the sleeves by means of keys or lugs secured thereto which ride in longitudinal slots or grooves formed in the sleeves and suitable means, as spring washers, may be provided between abutments on the screw shanks and sleeves which will prevent the stems from being accidentally moved from any given position of adjustment while at the same time offering but slight resistance to the turning of the screws in manually effecting such adjustment.

The above and further objects and novel features of the invention will appear from the following specifications taken with the accompanying drawing, in which, Fig. 1 is a perspective view of welding apparatus embodying this invention, showing the same in use for welding between curved surfaces.

Fig. 2 is a view of the same in rear elevation and on an enlarged scale as compared with Fig. 1.

Fig. 3 is a detailed view in longitudinal section and on a further enlarged scale of one of the runners and the associated mechanism for effecting axial adjustment thereof relative to the carriage; the carriage being shown fragmentarily.

The invention is illustrated in the drawing as applied to welding apparatus but it is to be understood that the same is also applicable to cutting apparatus of a similar nature.

The embodiment of the invention as illustrated comprises a heating unit, such as an oxy-acetylene blowpipe T, for supplying welding heat; a guide tube G for feeding a welding rod R to the welding point P and preferably adjustably connected to the blowpipe; a carriage C connected to the blowpipe and suitable supports S therefor including runners 10 connected to the carriage for angular and axial adjustment relative thereto. The blowpipe is provided with the usual handle H which is connected with the heating unit T by a gas conveying stem 12 and serves for manipulating the blowpipe in controlling the welding operation. The heating unit T consists of a welding head 11 and tips 13 and 14 connected therewith; tip 13 serving to supply a flame to maintain the welding puddle fluid and to melt the lower end of the welding rod R as it is fed into the molten puddle; and tip 14, preferably smaller than tip 13, serving to direct a preheating flame upon the rod R at a point above the puddle. During the welding operation, the work and the apparatus are moved relatively to one another in the direction of the seam to be welded, and the apparatus may be rocked about a fulcrum along the line of contact of the runners 10 and the work to control the operation, as more fully described in the aforesaid application Ser. No. 576,894.

The carriage C includes a pair of arms 15 connected with and extending rearwardly from the welding head and terminating in bearing heads or sleeves 16 positioned transversely of the ends of the arms and having axial bores in which a transverse bar 17 is journaled. The bar 17 terminates at both ends in heads or sleeves 18 extending transversely of and rigidly secured to the rod 17 so as to turn therewith in effecting angular adjustment of the runners. The heads 18 are provided with lateral extensions 19 in which the ends of the bar 17 are connected, and the ends of these extensions and the ends of the bearing heads 16 facing them are milled as shown at 20 to provide a clutching action when the heads 16 are forced against the extensions by suitable means as nuts 21 threaded onto the bar 17. By this arrangement, it readily appears that stems 23 and the runners 10 mounted thereon may be locked in any desired position of angular adjustment.

The heads 18 have bores therethrough and tubular sleeves 22 are secured in these bores as by welding so as to extend upward from the heads. These sleeves 22 are adapted to telescopically receive therein the tubular stems 23 formed integrally with or otherwise rigidly secured to the runners 10. The bores of these stems are provided at their upper ends with threaded portions 24 coacting with the threads of screws 25 which are rotatably mounted in the sleeve 22 and are secured therein against axial movement relative thereto by swivel connections between the screws and plugs 26 threaded into the upper ends of the sleeves. The swivel connections are effected by the co-operation of shoulders 27 and split rings 27a sprung into annular grooves 25a formed in the screw shanks and abutting respectively the outer and inner ends of the plugs. The stems 23 of the runners are free to slide axially of the sleeves 22 but are secured against rotation relative thereto by guide pins or lugs 29 which project into and slide along slots 30 formed in and extending longitudinally of the sleeves 22 from a point adjacent but spaced from their upper ends to the lower ends thereof. Thus it is seen by rotating the screws 25 the stems may be projected from or retracted into the sleeves 22 and this may be accomplished by gripping the heads 28 with one's hand and rotating the screws. The stems are prevented from accidental displacement from their positions of adjustment by suitable means as a spring washer 31 located in a recess 32 formed in the upper ends of the plugs and pressing against the under surfaces of the shoulders 27.

For convenience of manufacture, the threaded portions 24 of the stems 23 may be formed separately from the stem and secured thereto by lap joints as shown at 33 and the rings 27a may be split so as to be readily sprung into annular grooves 23, as shown in Fig. 3, after the screws 25 have been assembled with the plugs 26.

In order that a fine adjustment of the stems 23 relative to the sleeves 22 and of the stems relative to each other may be effected with accuracy, the sleeves are provided with graduations 35 adjacent the slots 30 which may be markings or thin brass rings encircling and embedded in the surface of the sleeves and spaced at equal distances apart, correspondingly numbered graduations being at the same distances above the heads 18.

The guide tube G may be connected to the welding head for relative angular adjustment and such adjustment is made possible by providing a pivotal connection 36 between the tube and welding head together with opposing pairs of ears 37 on opposite sides of the tube and head through which screws 38 and 39 are threaded in push and pull relation to each other.

The operation in adjusting the runners both axially and angularly is believed to be made clear in the foregoing description. Axial adjustment of the runners may be effected by the operator, without lifting the apparatus off of the work, by turning the heads 28 of the screws 25 with his hand while at the same time judging with his eye or depending on the gradations as a guide in determining how much adjustment is required. Also the runners may be set in any relative adjustment the one to the other prior to use on work where there is a known difference in level between parts of the work. It will be noted that in making axial adjustment of the runners there is no turning movement thereof, requiring the lifting of the runners off of the work; and it will also be noted that the lugs 29 on the stems 23 serve as pointers coacting with the gradations to indicate the adjustment of the stems relative to the sleeves 22.

I claim:

1. In combination with welding or cutting apparatus; supporting means therefor adapted to rest upon the work being operated upon; said supporting means including stationary sleeves and stems slidably received therein; and means operable by hand for effecting an exclusively axial relative movement between the stems and sleeves.

2. In combination with welding or cutting apparatus; supporting means therefor adapted to rest on work being operated upon comprising members retractable axially one within the other and means for retracting and advancing one of said members relative to the other.

3. In welding or cutting apparatus including a carriage and means for supporting the carriage on work being operated upon; manually operable means for axially and nonrotatably adjusting the supporting means relative to the carriage.

4. In combination with a welding or cutting blowpipe; supports therefor; stems on said supports; sleeves attached to the blowpipe having bores adapted to telescopically receive said stems; and means rotatable relative to the sleeves and the stems for moving the stems into and out of the bores.

5. In combination with cutting or welding apparatus; a carriage therefor and supporting means for the carriage adapted to rest on the work being operated upon; said supporting means including non-rotatable members movable axially relative to the carriage and graduated means for gauging the advancement or retraction of the runners relative to the carriage.

6. In combination with cutting or welding apparatus; a carriage therefor and supporting means for the carriage adapted to rest on the work being operated upon, said supporting means including non-rotatable members adjustable relative to the carriage; graduated means for gauging the adjustment of the runners relative to the carriage; and hand operable means for effecting said adjustment.

7. In combination with cutting or welding apparatus; supporting runners connected therewith and adapted to rest upon work being operated upon; said runners including stems; longitudinally slotted sleeves connected with the apparatus for telescopically receiving said stems; lugs on the stems riding in the slots to prevent relative turning movement between the stems and sleeves; said sleeves having gradations along the lines of the slots; and means for advancing and retracting the stems in the sleeves.

8. In welding or cutting blowpipe apparatus, the combination of a blowpipe; a carriage upon which the blowpipe is mounted; means for supporting the carriage on work; means for adjusting the supporting means with respect to the carriage; and means operable to prevent accidental displacement of the supporting means from adjusted position which will at the same time oppose no material resistance to adjusting manipulation thereof.

9. A runner for welding or cutting apparatus comprising a foot adapted to engage the work; a stem secured to said foot; a sleeve in which said stem fits and slides; and means mounted on said sleeve and operatively connected to said stem to adjust the latter in either direction along said sleeve.

10. A runner for welding and cutting apparatus comprising a foot having a rounded surface adapted to engage the work; a stem secured to said foot; a sleeve in which said stem fits and slides; and means mounted on said sleeve and operatively connected to said stem to adjust the latter in either direction along said sleeve.

11. A runner for welding and cutting apparatus comprising a foot adapted to engage the work; a stem secured to said foot; a sleeve in which said stem fits and slides; and a screw mounted on said sleeve and operatively connected to said stem to adjust the latter in either direction along said sleeve.

JOHN M. HALBING.